United States Patent
Cho (10) Patent No.: US 9,464,937 B2
(45) Date of Patent: Oct. 11, 2016

(54) METHOD AND DEVICE FOR DIFFERENTIAL OPTICAL PHASE MODULATION IN QUANTUM KEY DISTRIBUTION SYSTEM

(71) Applicant: SK TELECOM CO., LTD., Seoul (KR)

(72) Inventor: Jeong-sik Cho, Daejeon (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/691,133

(22) Filed: Apr. 20, 2015

(65) Prior Publication Data

US 2015/0226609 A1 Aug. 13, 2015

Related U.S. Application Data

(63) Continuation of application No. PCT/KR2013/007507, filed on Aug. 21, 2013.

(30) Foreign Application Priority Data

Oct. 18, 2012 (KR) .................. 10-2012-0116268

(51) Int. Cl.
| | | |
|---|---|---|
| *G01B 9/02* | (2006.01) | |
| *G01J 3/453* | (2006.01) | |
| *H04B 10/70* | (2013.01) | |
| *H04L 9/08* | (2006.01) | |

(52) U.S. Cl.
CPC ............. *G01J 3/4535* (2013.01); *H04B 10/70* (2013.01); *H04L 9/0852* (2013.01); *H04L 9/0858* (2013.01); *H04L 2209/24* (2013.01)

(58) Field of Classification Search
CPC .... G01J 3/4535; H04B 10/70; H04L 9/0852; H04L 9/0858; H04L 2209/24
USPC ........................................ 356/477
See application file for complete search history.

(56) References Cited

U.S. PATENT DOCUMENTS

| | | | | |
|---|---|---|---|---|
| 2011/0150226 A1* | 6/2011 | Cho | ............. | H04B 10/70 380/278 |
| 2012/0045053 A1* | 2/2012 | Qi | ............. | G06F 7/588 380/252 |
| 2014/0205302 A1* | 7/2014 | Chen | ............. | H04L 9/0852 398/188 |

FOREIGN PATENT DOCUMENTS

| | | |
|---|---|---|
| JP | 1999331089 A | 11/1999 |
| JP | 4883813 B2 | 2/2012 |
| KR | 1020000049868 A | 8/2000 |
| KR | 1020070061016 A | 3/2007 |
| KR | 1020110071803 A | 6/2011 |

OTHER PUBLICATIONS

International Search Report for PCT/KR2013/007507 dated Dec. 4, 2013, citing the above reference(s).

* cited by examiner

*Primary Examiner* — Tarifur Chowdhury
*Assistant Examiner* — Jonathon Cook
(74) *Attorney, Agent, or Firm* — Hauptman Ham, LLP (57) ABSTRACT

A transmitting apparatus in a quantum key distribution system, includes: an optical interferometer to receive a single-photon pulse inputted from a light source and to provide two optical paths with a predetermined path difference, the two optical paths used for the single-photon pulse to pass through the optical interferometer; and an optical phase modulator to perform a temporal differential phase modulation of the single-photon pulse which has passed through the optical interferometer, wherein the single-photon pulse, after passing through the optical interferometer, has a probability distribution divided into two separate regions in time domain.

19 Claims, 10 Drawing Sheets

METHOD AND DEVICE FOR DIFFERENTIAL OPTICAL PHASE MODULATION IN QUANTUM KEY DISTRIBUTION SYSTEM

CROSS-REFERENCE TO RELATED APPLICATIONS

The present application is a continuation of International Patent Application No. PCT/KR2013/007507, filed on Aug. 21, 2013, which is based upon and claims the benefit of priority to Korean Patent Application No. 10-2012-0116268, filed on Oct. 18, 2012. The disclosure of the above-listed applications are hereby incorporated by reference herein in their entirety.

TECHNICAL FIELD

The present disclosure in one or more embodiments relates to a method and apparatus for differential optical phase modulation, which are applicable to phase modulation-based quantum key distribution systems.

BACKGROUND

The statements in this section merely provide background information related to the present disclosure and do not necessarily constitute prior art.

A quantum key distribution system transmits a single photon to a recipient after loading key information by adjusting polarization or phase of the single photon. The recipient extracts the key information using a polarization receiver, an optical phase modulator, and so on. This single-photon transmission is achieved using optical communication technologies, and the quantum key distribution system targeting long-distance transmission may primarily use a single mode optical fiber as a quantum channel. When a polarization-modulated single photon is transmitted through the single-mode optical fiber, polarization properties become unstable, thus deteriorating transmission performance. Therefore, a phase modulation scheme is preferred to a polarization modulation scheme for the key distribution.

A phase modulation-based quantum key distribution system mainly uses a time-division optical interference scheme. The time-division optical interference scheme can be induced by using an asymmetric optical interferometer, an optical phase modulator, and so on. An asymmetric optical interferometer is configured to have two optical paths with different length for generating optical interference. Single photons inputted to the asymmetric optical interferometer are split into two probability distributions with different coordinates in the time domain. The optical phase modulator modulates the phase of the single photons passing through one of these paths. A receiving-end asymmetric optical interferometer divides the probability distributions into four coordinates in the time domain. If the asymmetric optical interferometers of the transmitter and the receiver have the same path difference, interference occurs between two neighbors among the four probability distributions of the single photon due to their overlap. The receiver also includes an optical phase modulator that modulates the phase of a single photon. The inventor(s) has noted that when the sum of the phase modulations from the transmitting and receiving ends is $2n\pi$, where n is an integer, the two superpositioned probability distributions of the single photons interfere constructively to exhibit a maximal detection probability. The inventor(s) has noted that in contrast, when the sum is $(2n+1)\pi$, the two superimposed probability distributions of the single photons interfere destructively, resulting in the minimal detection probability. The inventor(s) has noted that this implies that the performance of the optical interferometer affects the overall performance of a quantum cryptography system.

The inventor(s) has experienced that to obtain excellent optical interference, it is important to secure stable polarization and phase properties of the optical interferometer. The inventor(s) has noted that Two single photons interfering with each other in the receiver need to have equal polarization, and the phase needs to be kept constant throughout the optical path except for the total phase modulation amount additionally provided by the optical phase modulators. The inventor(s) has noted that for this purpose, optical interferometers have precise configurations, and a phase compensated control could be optionally performed as a complementary measure.

Figure 1:
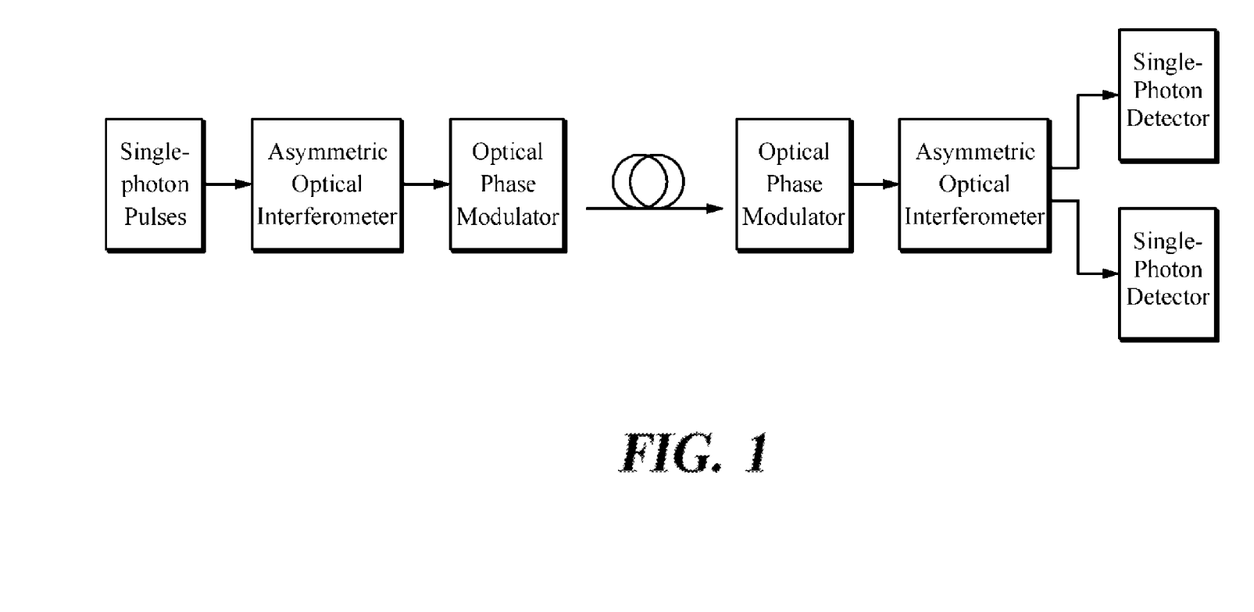
FIG. 1 is a schematic diagram of a known phase modulation-based-quantum key distribution system.

To address the instability of known interferometers arising from positioning an optical phase modulator on the interferometer path, Korean Patent Application Publication No. 10-2011-0071803 has proposed, as illustrated in FIG. 1, positioning the optical phase modulator external to the interferometer in order to simplify the configuration of the optical interferometer and to mitigate difficulties, such as an extension of an optical path caused by the optical phase modulator, enhanced instability and insertion loss in the optical interferometer.

SUMMARY

In accordance with at least one embodiment of the present disclosure, a transmitting apparatus in a quantum key distribution system, comprises an optical interferometer and an optical phase modulator. The optical interferometer is configured to receive a single-photon pulse inputted from a light source and provide two optical paths with a predetermined path difference, the two optical paths used for the single-photon pulse to pass through the optical interferometer. And the optical phase modulator is configured to perform a temporal differential phase modulation of the single-photon pulse which has passed through the optical interferometer. Herein, the single-photon pulse, after passing through the optical interferometer, has a probability distribution divided into two separate regions in time domain.

In accordance with another embodiment of the present disclosure, a receiving apparatus in a quantum key distribution system is provided, including an optical phase modulator and an optical interferometer. The optical phase modulator is configured to receive a single-photon pulse, which has been differentially phase-modulated, from a transmitting apparatus of the quantum key distribution system and performs a temporal differential phase modulation of the received single-photon pulse. The optical interferometer is connected to the optical phase modulator and is configured to provide two optical paths for the single-photon pulse to pass through, the two optical paths having the same path difference as in the transmitting apparatus. The single-photon pulse received from the transmitting apparatus has a probability distribution divided into two separate regions in time domain or has a so-called time-division probability distribution.

In accordance with yet another embodiment of the present disclosure, a method for transmission of quantum information in a quantum key distribution system is provided, including: receiving a single-photon pulse from a light source; dividing the probability distribution of the single-photon pulse into two separate regions in time domain providing the single-photon pulse with two optical paths having a path length difference; performing a temporal differential optical phase modulation of two single-photon pulses time-divided; and transmitting a differentially modulated single-photon pulse to a receiving apparatus via a quantum channel.

In accordance with yet another embodiment of the present disclosure, a method for reception of quantum information in a quantum key distribution system is provided, including: receiving a single-photon pulse having time-divided probability distributions from a transmitting apparatus via a quantum channel; performing an optical phase modulation that temporally and differentially modulates the received single-photon pulse; providing the phase-modulated single-photon pulse with two optical paths having the same path length difference as in the transmitting apparatus so that the phase-modulated single-photon pulse has an additional time-divided probability distribution and two probability distributions among them superimposes and interferes; and detecting the single-photon pulse.

DETAILED DESCRIPTION

Hereinafter, at least one embodiment of the present disclosure will be described in detail with reference to the accompanying drawings. In the following description, like reference numerals would rather designate like elements, although the elements are shown in different drawings. Further, in the following description of the at least one embodiment, a detailed description of known functions and configurations incorporated herein will be omitted for the purpose of clarity and for brevity.

Some embodiments of the present disclosure provide improvement of a phase modulation-based quantum key distribution system that attains a higher optical interferometer stability by employing an externally positioned optical phase modulator, through reduction of the requisite operating ranges of the modulator and its driver by applying differential phase modulation to two time-divided pulses.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. Throughout the specification, the act to 'include' or 'have' is meant not to be exclusive but to be inclusive of certain additional components unless defined to the contrary.

In accordance with an embodiment of the present disclosure, a quantum key distribution system with an interferometer and an external optical phase modulator can change the phase modulation amount at the transmitting and receiving ends, as proposed by Korean Patent Application Publication No. 10-2011-0071803, as well as achieve the same phase modulation effect by applying a phase modulation signal whose intensity is half of that in the prior art method.

Figure 2:
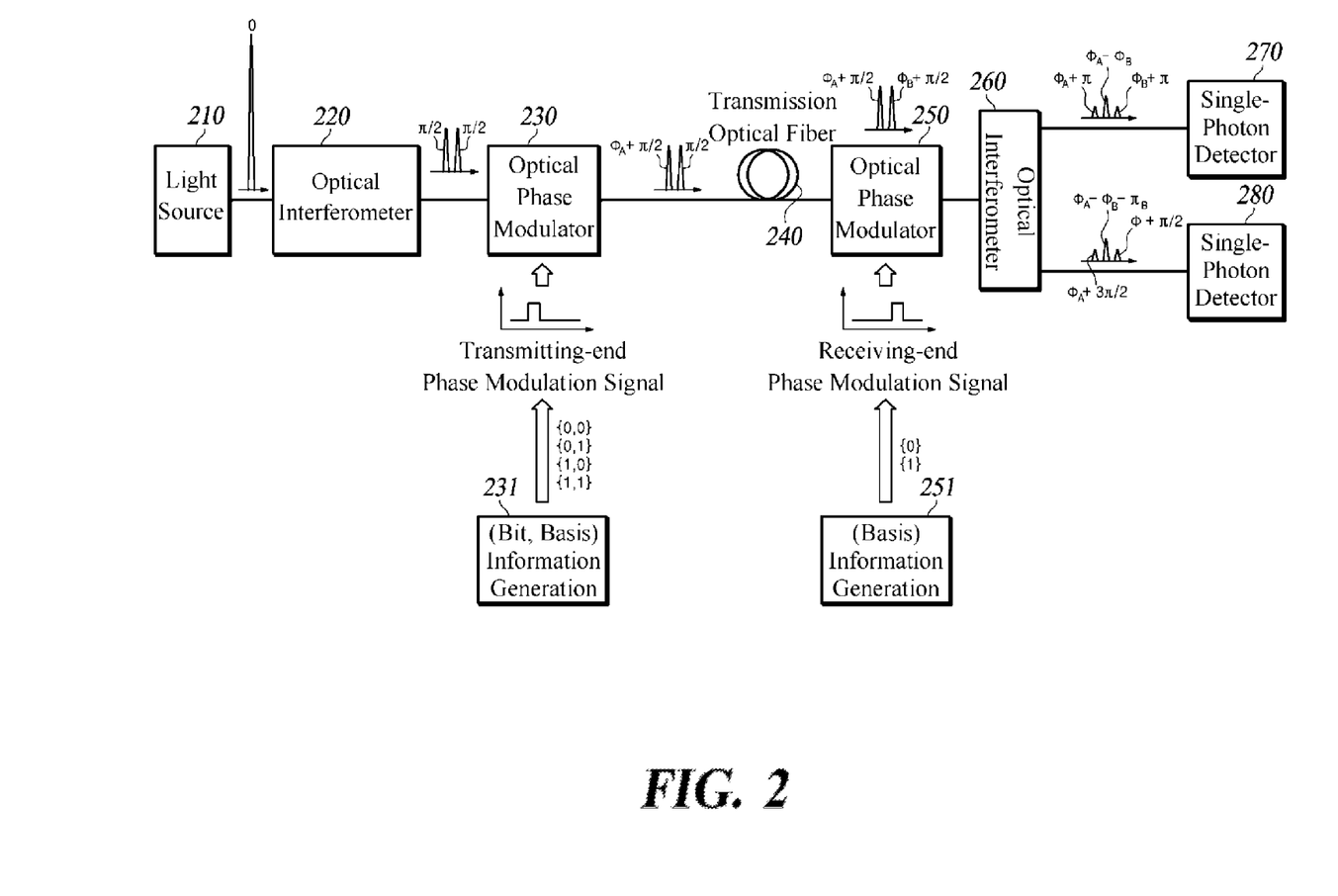
FIG. 2 is a diagram exemplarily illustrating the structure of a quantum key distribution system with an optical phase modulator positioned external to the path of an optical interferometer, and phase changes of pulses at respective stages according to at least one embodiment of the present disclosure.

FIG. 2 illustrates a quantum key distribution system with an optical phase modulator positioned e.g., external to an optical interferometer together with some sectional phase changes of pulses.

FIG. 2 demonstrates that light pulses including single photons, i.e., single-photon pulses from a light source 210 are incident on an optical interferometer 220. The laser beam emitted from a light source may practically be laser pulses of an extremely low radiation level containing a very small number of photons, the description in the present embodiment is based on the single-photon pulses.

FIG. 2 shows several probability distribution curves of the single-photon pulses at the respective stages as a function of time, wherein each defined pulse is represented by a relative phase of the corresponding single-photon pulse. Here, the relative phase is determined based on the phase of the single-photon pulses incident from light source 210 onto optical interferometer 220. For example, from the probability distribution curves presented at the output side of optical interferometer 220, it can be seen that the single-photon pulses that have passed through optical interferometer 220 have a probability distribution following two separated pulse-shaped probability distribution curves and that $\pi/2$ phase modulation is imposed to the phases of the single-photon pulses corresponding to the pulse-shaped presence probability distributions.

Optical interferometer 220 provides the incident single-photon pulses with two optical paths, with a predetermined path difference, which may be achieved using an optical interferometer including an optical fiber/optic system-based Mach-Zehnder interferometer or an optical fiber/optic system-based Michelson interferometer. Owing to the path difference, the time-dependent probability distribution of the single-photon pulses after passing through optical interferometer 220 follows two separated pulse-shaped probability distribution curves in the time axis. The respective phase modulations of π/2 are applied to the single-photon pulses after they have passed through optical interferometer 220, using an optical coupler inside optical interferometer 220. Specifically, an optical system-based interferometer includes a 2×2 optical coupler which does not cause any phase change in response to parallel input and output, but involves a phase change of π/2 from the intersecting input and output.

An optical phase modulator 230 selectively modulates the phase of the single-photon pulses that have passed through either the shorter path or the longer path both provided by the optical interferometer. Which of the two optical paths is used by the single-photon pulses incident on optical phase modulator 230 can be determined by using the time of arrival at optical phase modulator 230. This makes it possible to modulate only the single-photon pulses that pass through the short path, thus enables a selective modulation. In other words, optical phase modulator 230 modulates the phase of the single-photon pulses that pass through optical interferometer 220 during the time corresponding to any one pulse-shaped curve of their time-division probability distribution. The amount of phase modulation performed by optical phase modulator 230 ($\phi_A$) is determined by randomly combining bit information and basis information. The aforementioned process will be detailed with reference to FIG. 3.

After passing through the transmitting-end optical phase modulator 230, the single-photon pulses reach a receiving-end optical phase modulator 250 through an optical-fiber-based quantum channel 240.

The receiving-end optical phase modulator 250 modulates the phase of the single-photon pulses that pass during the time corresponding to the other pulse shape curve of their time-division probability distribution, i.e., the single-photon pulses that have not undergone phase modulation in the transmitting-end optical phase modulator 230. In other words, if the transmitting-end optical phase modulator 230 performs phase modulation of the single-photon pulses passing through the shorter path, the receiving-end optical phase modulator 250 modulates the phase of those passing through the longer path. The amount of phase modulation ($\phi_B$) performed by the receiving-end optical phase modulator 250 is determined according to the randomly generated basis information, which will be described with respect to FIG. 3.

Through this process, a single photon incident on the transmitting-end optical interferometer 220 is phase-modulated by the transmitting-end optical interferometer 230 as much as $\phi_A$ when it passes through path 1 of the transmitting-end optical interferometer 220, and is phase-modulated by the receiving-end optical phase modulator 250 as much as $\phi_B$ if it passes through path 2 of the transmitting-end optical interferometer 220.

A receiving-end optical interferometer 260 is provided with two optical paths through which a single-photon pulse can pass after passing through optical phase modulator 250, with their path difference being the same as that of the transmitting-end optical interferometer 220. The receiving-end optical interferometer 260 may also be implemented with an optical fiber-based Mach-Zehnder or Michelson interferometer.

Receiving-end optical interferometer 260 temporally divides the time-division probability distribution of a single photon that is already divided into two segments on the time axis into four segments. Here, with the path difference of the optical interferometers of the transmitting and receiving ends 220, 260 being the same, two adjacent ones among the four segments of the probability distribution curve overlap and interfere with each other. Consequently, the probability distribution has three different pulse shapes, as illustrated in FIG. 2.

The probability distribution of the two superimposed single photons incurs constructive or destructive interference depending on the relative phase difference. Specifically, if the phase modulation amounts at the transmitting and receiving ends add up to 2 nπ or (2n+1)π (where n is an integer), the probability distribution of the two superimposed single photons respectively exhibits the maximum or the minimum detection probability through constructive or destructive interference. The time segments corresponding to the two non-interfering probability distribution always exhibit a constant detection probability and are thus excluded from consideration because they cannot transmit any information.

At the receiving end there are provided two single photon detectors (SPD) 270, 280 operated in a gated Geiger mode so that only the interference signal at the center of the two output signals that pass through the receiving-end optical interferometer 260 is selectively detected. The outputs of the interferometer 260 relate to each other in a complementary manner: if one shows the maximum intensity, the other shows the minimum intensity. The receiving end interprets the two detection signals in a complementary manner and estimates the bit signals transmitted from the transmitting end.

Figure 3:
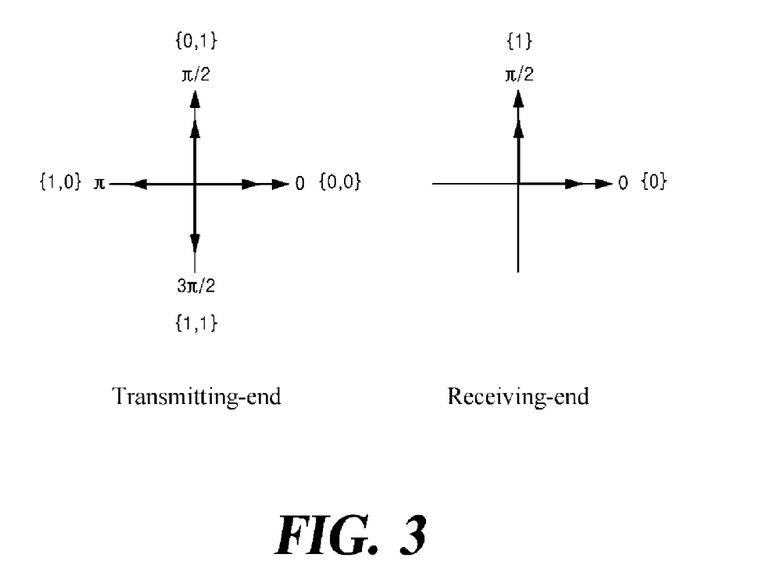
FIG. 3 is a diagram of a combination of phase modulation amounts by the transmitting end and receiving end of FIG. 2 according to at least one embodiment of the present disclosure.

FIG. 3 is a diagram of combinations of the phase modulation amounts of the transmitting and receiving ends shown in FIG. 2.

As depicted in FIG. 3, the transmitting end assigns four phase modulation amounts (0, π/2, π, 3π/2) to each of the four combinations of randomly generated {bit, basis} signals, and the receiving end assigns two phase modulation amounts (0, π/2) to the two randomly generated basis signals; instead of the amounts (0, π/2), amounts (π, 3π/2) may be assigned.

Table 1 displays the phase modulation amounts of the transmitting and receiving ends and the corresponding detection probability of the receiving-end single photon detector when the BB84 (Bennett Brassard 84) protocol based on the phase modulation amounts in FIG. 3 is applied to the system in FIG. 2.

TABLE 1

| Stage | Content | Modulation Amount | | | | | | | |
|---|---|---|---|---|---|---|---|---|---|
| 1 | Transmitting (Tx)-end bit information | 0 | | 1 | | 0 | | 1 | |
|   | Tx-end basis information | 0 | 1 | 0 | 1 | 0 | 1 | 0 | 1 |
| 2 | Tx-end phase modulation ($\phi_A$) | 0 | π/2 | π | 3π/2 | 0 | π/2 | π | 3π/2 |
| 3 | Receiving (Rx)-end basis information | 0 | | | | 1 | | | |

TABLE 1-continued

| Stage | Content | Modulation Amount | | | | | | | |
|---|---|---|---|---|---|---|---|---|---|
| 4 | Rx-end phase modulation ($\phi_B$) | 0 | | | | $\pi/2$ | | | |
| 5 | Phase difference of optical interference at output 1 ($\phi_A - \phi_B$) | 0 | $\pi/2$ | $\pi$ | $3\pi/2$ | $-\pi/2$ | 0 | $\pi/2$ | $\pi$ |
|  | Phase difference of optical interference at output 2 ($\phi_A - \phi_B - \pi$) | $-\pi$ | $-\pi/2$ | 0 | $\pi/2$ | $-3\pi/2$ | $-\pi$ | $-\pi/2$ | 0 |
| 6 | Detector 1 detection probability | Max | ? | Min | ? | ? | Max | ? | Min |
|  | Detector 2 detection probability | Min | ? | Max | ? | ? | Min | ? | Max |

Referring to Table 1, the transmitting-end optical phase modulator 230 modulates phases based on the four different phase modulation amounts by combining bit information and basis information. In other words, similar to cases where the quadrature phase-shift keying (QPSK) method used in known communication technologies is applied, single-photon pulses having the phase modulation amounts of 0, $\pi/2$, $\pi$, and $3\pi/2$ can be generated. The receiving-end optical phase modulator 250 modulates phases based on the two randomly generated basis signals, by applying modulations of 0 or $\pi/2$, or of $\pi$ or $3\pi/2$. In general, the phase modulation of 0 or $\pi/2$ is applied so that orthogonal basis informations are encoded, for a more convenient operation of the receiving-end optical phase modulator 250.

As a result, optical interference occurs due to phase modulation, as shown in Table 1. In the BB84 protocol, a single photon can be detected with the maximum or minimum probability at the receiving end only if the transmitting and receiving ends have the same basis information. The "?" in Table 1 represents the cases where a single photon is detected with neither the maximum nor the minimal detection probability because the basis information at the transmitting and receiving ends does not coincide. These results are discarded as being invalid in the key sifting process of a quantum key distribution system.

Figure 4:
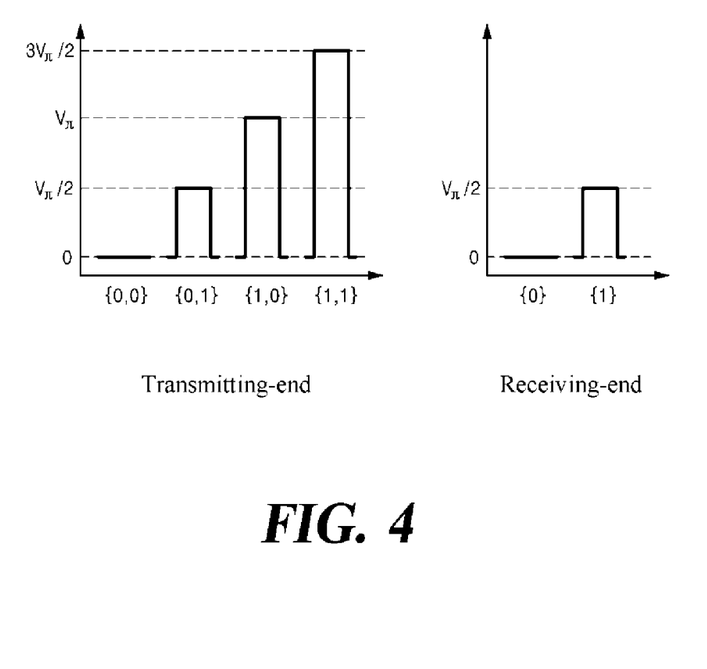
FIG. 4 is a diagram of phase modulation signals required by the transmitting and receiving ends shown in FIG. 2 for applying the phase modulation amounts illustrated in FIG. 3 according to at least one embodiment of the present disclosure.

FIG. 4 is a schematic representation of the phase modulation signals required at the transmitting and receiving ends in FIG. 2 to modulate the phase modulation amounts displayed in FIG. 3.

FIG. 4 shows the phase modulation signals based on the voltage $V_\pi$ required for an optical phase modulator to perform a half-wavelength ($\pi$) optical phase modulation. Since the transmitting end uses phase modulation amounts {0, $\pi/2$, $\pi$, $3\pi/2$} in order to distinguish bit or basis information combination, the maximum $V_{pp}$ (peak-to-peak voltage) of the phase modulation signal inputted into the transmitting-end optical phase modulator 230 corresponds to 1.5-fold of $V_\pi$. Given that $V_\pi$ of a known optical phase modulator is 3 to 5 V, the maximum $V_{pp}$ of the phase modulation signal required at the transmitting end is 4.5 to 7.5 V.

Figure 5:
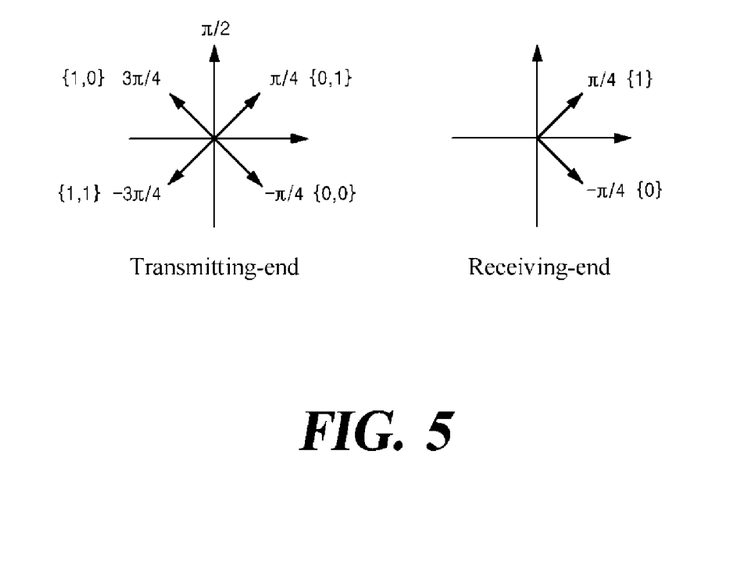
FIG. 5 is a diagram of another combination of the phase modulation amounts of the transmitting and receiving ends applicable to the BB84 protocol according to at least one embodiment of the present disclosure.

FIG. 5 displays other combinations of the phase modulation amounts at the transmitting and receiving ends that may be applied to the BB84 protocol.

The phase modulation amounts displayed in FIG. 5 coincide with the four phase modulation amounts assigned to the transmitting end ($\phi_A$) and the two phase modulation amounts assigned to the receiving end ($\phi_B$) in FIG. 3, each shifted by $-\pi/4$. At the receiving end, the phase modulation amounts ($3\pi/4$, $-3\pi/4$) may be applied instead of ($\pi/4$, $-\pi/4$), but the application of ($\pi/4$, $-\pi/4$) is desirable because they can be obtained with phase modulation signals of relatively low $V_{pp}$.

Table 2 displays the phase modulation amounts of the transmitting and receiving ends and the ensuing detection probability of the receiving-end single photon detector when the BB84 protocol based on the phase modulation amounts in FIG. 5 is applied to the system in FIG. 2.

TABLE 2

| Stage | Content | Modulation Amount | | | | | | | |
|---|---|---|---|---|---|---|---|---|---|
| 1 | Tx-end bit information | 0 | 1 | 0 | 1 | 0 | 1 | 0 | 1 |
|  | Tx-end basis information | 0 | 1 | 0 | 1 | 0 | 1 | 0 | 1 |
| 2 | Tx-end phase modulation ($\phi_A$) | $-\pi/4$ | $\pi/4$ | $3\pi/4$ | $-3\pi/4$ | $-\pi/4$ | $\pi/4$ | $3\pi/4$ | $-3\pi/4$ |
| 3 | Rx-end basis information | 0 | | | | 1 | | | |
| 4 | Rx-end phase modulation ($\phi_B$) | $-\pi/4$ | | | | $\pi/4$ | | | |
| 5 | Phase difference of optical interference at output 1 ($\phi_A - \phi_B$) | 0 | $\pi/2$ | $\pi$ | $-\pi/2$ | $-\pi/2$ | 0 | $\pi/2$ | $\pi$ |
|  | Phase difference of optical interference at output 2 ($\phi_A - \phi_B - \pi$) | $-\pi$ | $-\pi/2$ | 0 | $-3\pi/2$ | $-3\pi/2$ | $-\pi$ | $-\pi/2$ | 0 |
| 6 | Detector 1 detection probability | Max | ? | Min | ? | ? | Max | ? | Min |
|  | Detector 2 detection probability | Min | ? | Max | ? | ? | Min | ? | Max |

As in Table 1, the receiving-end single photon detectors 270, 280 can detect a single photon with the maximum or minimum probability only if the transmitting and receiving ends have the same basis information.

Given that a phase modulation-based quantum key distribution system uses the principle of constructive or destructive interference occurring due to the phase difference of the interfering light waves due to the difference in phase modulation amounts applied at the transmitting and receiving ends, the same operation method applies to proportionally changed phase modulation amounts, as shown in FIG. 5.

Figure 6:
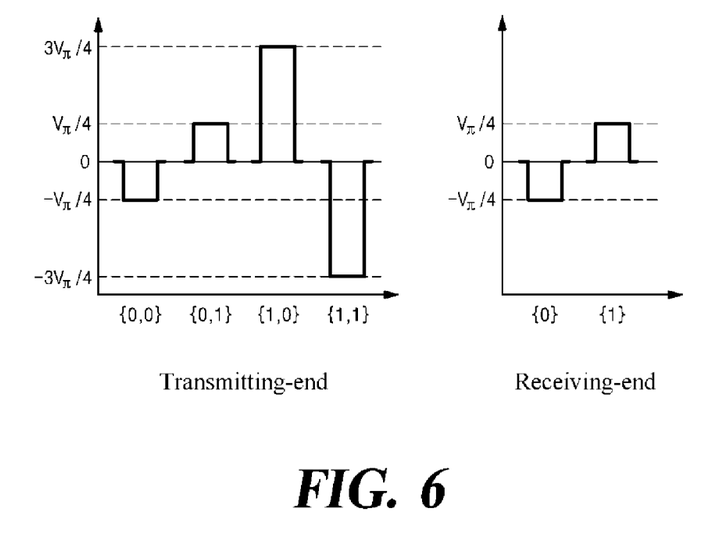
FIG. 6 is a diagram of phase modulation signals required by the transmitting and receiving ends shown in FIG. 2 for applying the phase modulation amounts illustrated in FIG. 5 according to at least one embodiment of the present disclosure.

FIG. 6 illustrates the phase modulation signals required at the transmitting and receiving ends in FIG. 2 in order to modulate the phase modulation amounts displayed in FIG. 5.

As depicted in FIG. 6, in cases where a single photon passing through a specific path of an optical interferometer is selectively phase-modulated, the transmitting-end optical phase modulator 230 requires phase modulation signals having $V_{PP}$ values of $-V_\pi/4$, $+V_\pi/4$, $-3V_\pi/4$, or $+3V_\pi/4$ in order to obtain the phase modulation amounts displayed in FIG. 5. Therefore, the transmitting-end optical phase modulator 230 operates in the maximum range of $\pm\sqrt[3]{4}V_\pi$ and its driving range is 1.5-fold of $V_\pi$. This result coincides with that in FIG. 4.

In contrast to the selective phase modulation in FIG. 2, the present disclosure performs the differential phase modulation of a temporally divided single-photon pulse in order to reduce the driving range of the optical phase modulator. In other words, unlike the phase modulation method shown in FIG. 2, in which only the single-photon pulse that has passed through one specific path in the transmitting-end optical interferometer 220 is selectively phase-modulated, the present disclosure differentially modulates the phase of a single-photon pulse passing through each path.

In the following, a quantum key distribution system using the differential phase modulation method is explained, as shown in FIGS. 7 to 10.

Figure 7:
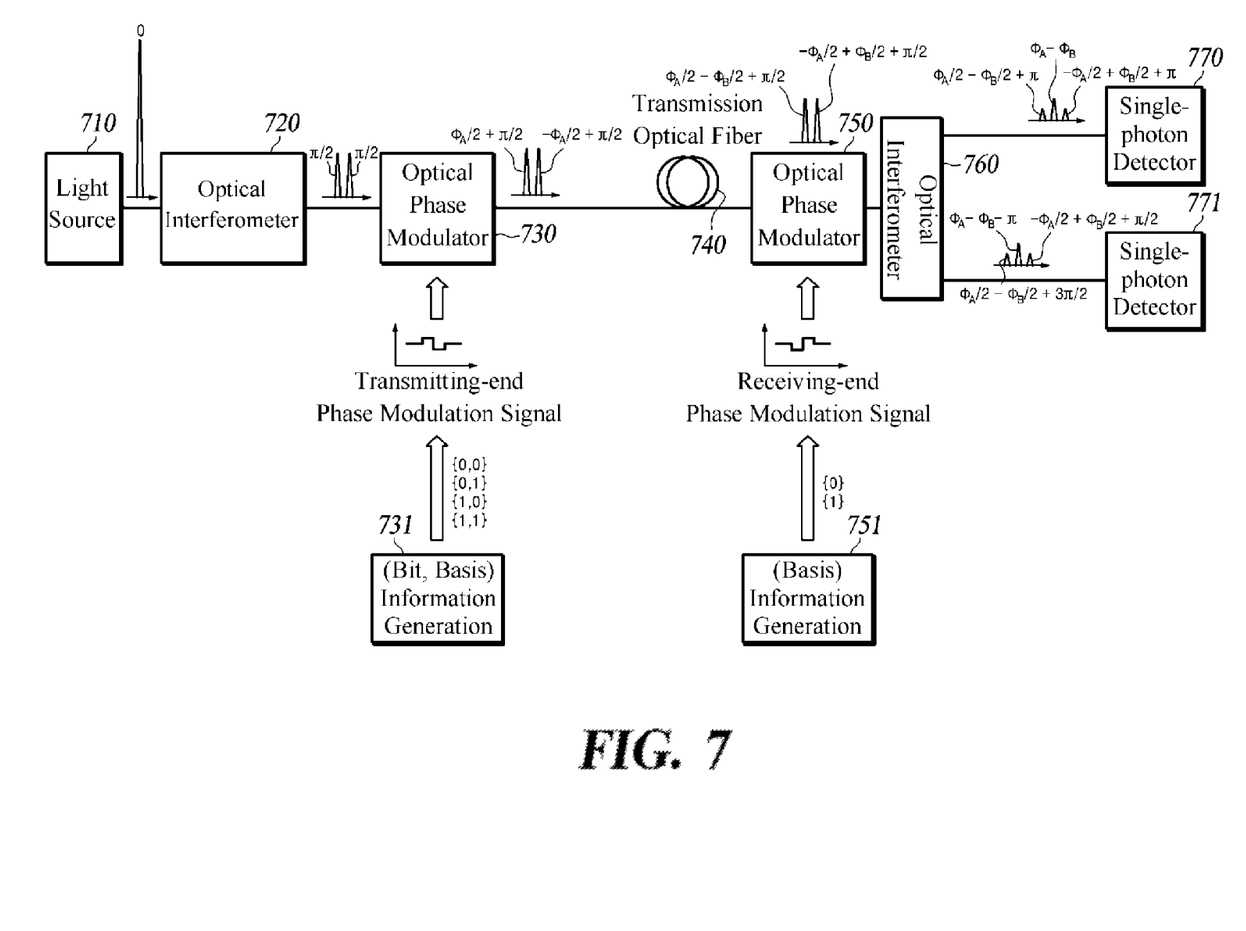
FIG. 7 is a diagram of the configuration of a quantum key distribution system using differential optical phase modulation according to at least one embodiment of the present disclosure, illustrating phase modulation of pulses at the respective stages of the system according to at least one embodiment of the present disclosure.

FIG. 7 is a diagram of a configuration of the quantum key distribution system and the schematic representation of each phase modulation stage in at least one embodiment of the present disclosure, in which the differential phase modulation method is applied.

In the quantum key distribution system shown in FIG. 7, except for the transmitting- and receiving-end optical phase modulators 730, 750, the remaining components 710, 720, 740, 760, 770 and 771 and their respective functions are the same as depicted in FIG. 2, and therefore their detailed explanation is omitted.

The transmitting-end optical phase modulator 730 performs differential modulation of a single-photon pulse having a time-division probability distribution. The transmitting-end optical phase modulator 730 differentially modulates the phase of the single-photon pulse inputted during the time corresponding to one pulse shape of the time-division probability distribution by $-\phi_A/2$, while for the other by $+\phi_A/2$. In other words, the differential phase modulation is performed by modulating the phase of the single-photon pulse that passes through one of the two optical paths provided by the transmitting-end optical interferometer 730 by $-\phi_A/2$ and that of the single-photon pulse passing through the other path by $+\phi_A/2$, so that the phase difference between the two cases is $\phi_A$. The phase modulation amount ($\pm\phi_A/2$) of the transmitting-end optical phase modulator 730 is determined by the combinations (731) of randomly generated bit and basis information, as shown in FIG. 6.

The receiving-end optical phase modulator 750 also performs the differential modulation of a single-photon pulse having time-division probability distribution. In other words, the receiving-end optical phase modulator 750 modulates the phases of the single-photon pulses that have been phase-modulated at the transmitting end 730 by $+\phi_A/2$ and $+\phi_A/2$, respectively, further by $-\phi_B/2$ and $-\phi_B/2$. The phase modulation amount ($\pm\phi_B/2$) of the receiving-end optical phase modulator 750 is determined by the combinations (751) of randomly generated basis information, as shown in FIG. 6.

As described above, in the method disclosed here, the transmitting- and receiving-end optical phase modulators 730, 750 phase-modulate two time-divided single-photon pulses simultaneously by opposite values; this is achieved through differential modulation of the phase of a single-photon pulse having time-division probability distribution. This implies that the phase difference between two time-divided single-photon pulses in one-time modulation can be doubled.

Figure 8:
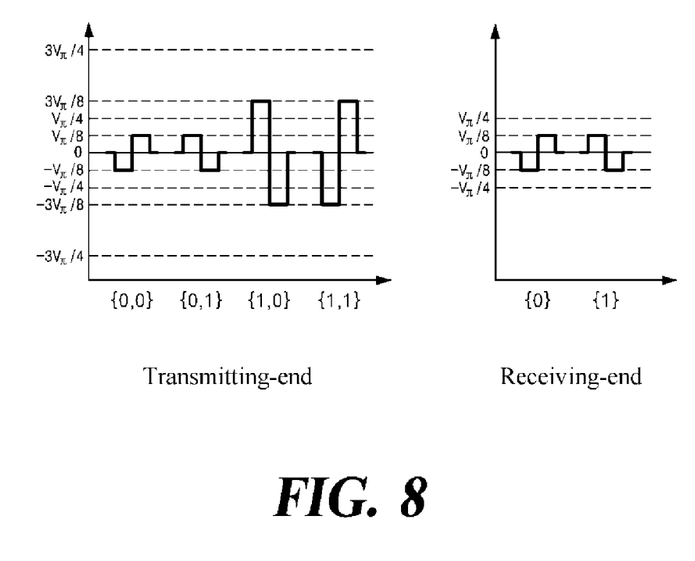
FIG. 8 is a diagram of the phase modulation signal input in an optical phase modulator for differential optical phase modulation according to at least one embodiment of the present disclosure.

FIG. 8 shows an example of phase modulation signals inputted into the optical phase modulator for differential phase modulation.

As depicted in FIG. 8, differential phase modulation can be implemented with a phase modulation signal switched in a single cycle from high- to low-level and another phase modulation signal switched in a single cycle from low- to high-level. Moreover, an accurate timing should be ensured so that the switched part coincides with the center point between the two time-divided pulse signals by generating an adequate time delay when inputting the phase modulation signals into the optical phase modulator.

If the above-described phase modulation is applied, differential modulation can be implemented because both high-level and low-level signals occur in the single cycle of the phase modulation signal so that if the high-level signal is applied to one pulse of the time-divided single-photon pulses, the low-level signal is automatically applied to the other pulse.

Table 3 outlines the phase modulation amounts of the transmitting-end optical phase modulator 730 according to bit and basis information as well as the input voltage for the optical phase modulator. Given that a signal inversion occurs in a single cycle, the phase modulation amounts are arranged in the first half and second half.

TABLE 3

| Bit Information | Basis Information | Input Voltage for Optical Phase Modulator (1st half) | Input Voltage for Optical Phase Modulator (2nd half) | Phase Modulation (1st half) | Phase Modulation (2nd half) | Phase Difference ($\Delta\phi$) |
|---|---|---|---|---|---|---|
| 1 | 1 | $-3\,V_\pi/8$ | $3\,V_\pi/8$ | $-3\pi/8$ | $3\pi/8$ | $-3\pi/4$ |
| 0 | 0 | $-V_\pi/8$ | $V_\pi/8$ | $-\pi/8$ | $\pi/8$ | $-\pi/4$ |
| 0 | 1 | $V_\pi/8$ | $-V_\pi/8$ | $\pi/8$ | $-\pi/8$ | $\pi/4$ |
| 1 | 0 | $3\,V_\pi/8$ | $-3\,V_\pi/8$ | $3\pi/8$ | $-3\pi/8$ | $3\pi/4$ |

As shown in Table 3, in the differential phase modulation method, the same phase difference can be obtained by applying a phase modulation signal whose amplitude is half of that in the prior art method.

According to this differential phase modulation method, even when two time-divided single-photon pulses have a phase difference as large as, for example, $3\pi/4$, the actual phase modulation signal input for carrying out the phase modulation is suffice to generate phase modulation of as low as $\pm 3\pi/8$ for each time-divided single-photon pulse. In other words, since the transmitting-end optical phase modulator 730 requires phase modulation signals with the maximum $V_{PP}$ of $3V_\pi/4$, an optical phase modulator, wherein $V_\pi$ is 5 V, can perform modulation well with a low-voltage signal i.e., 3.75 V. Therefore, the differential phase modulation method may reduce the burden of or standard performance requirements of the transmitting- and receiving-end optical phase modulators 730, 750 by half.

On the other hand, FIG. 8 shows that the transmitting-end phase modulation signals have four different values. Because bit and basis signals are randomly generated by a random signal generator in a quantum key distribution system, outputs are expressed as two-level digital signals, such as {1, 0} or {High, Low}. In order to generate four-level signals by using two-level bit and basis signals, signal synthesis should be performed. In the signal synthesis process based on AC coupling, 1 and 0 can be expressed as +V and −V, respectively. Assuming that the voltage gap generated by the bit signal is 2-fold that generated by a basis signal, the {bit, basis} combinations are {−2V, −V}, {−2V, +V}, {+2V, −V}, and {+2V, +V} for {0, 0}, {0, 1}, {1, 0}, and {1, 1}, and thus can be expressed as a voltage of −3V, −V, +V, and +3V, respectively.

According to Tables 2, 3 and FIG. 8, however, a system can operate correctly by configuring the {bit, basis} combinations of {0, 0}, {0, 1}, {1, 0} and {1, 1} as −V, +V, +3V and −3V, respectively. This result is not consistent with the result of the signal synthesis based on the above-mentioned AC coupling.

Figure 9:
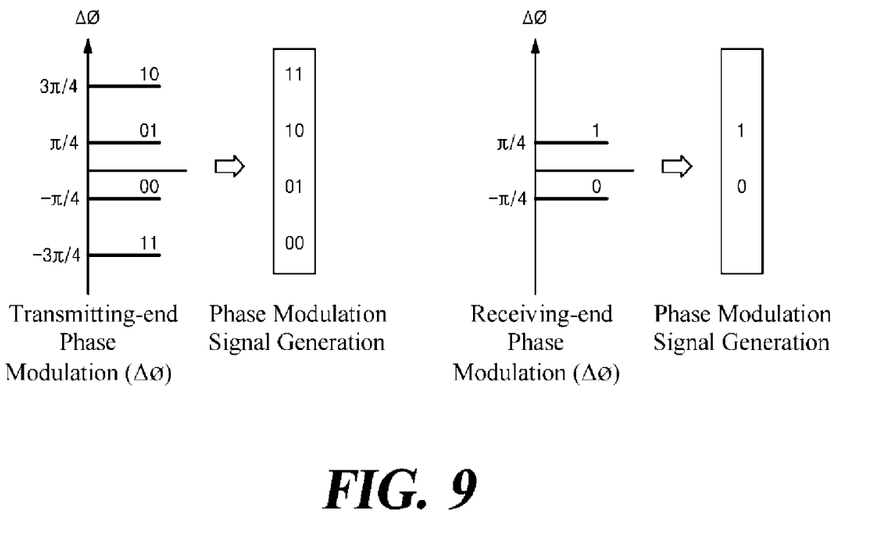
FIG. 9 is a diagram of representing the conversion of {bit, basis} combinations for generating phase modulation signals according to at least one embodiment of the present disclosure.

In the present embodiment, this discrepancy is solved by converting the signal, as shown in FIG. 9, while generating the phase modulation signals for the bit and basis signals at the transmitting and receiving ends.

FIG. 9 shows an example of the conversion of {bit, basis} combinations for generating the phase modulation signals.

In the present embodiment, as illustrated in FIG. 9, if the {bit, basis} signal combinations randomly generated using a random number generator (RNG) are {0, 0}, {0, 1}, {1, 0} and {1, 1}, they are converted into the combinations {0, 1}, {1, 0}, {1, 1} and {0, 0} using a signal converter. Based on this, phase modulation signals are generated.

Figure 10:
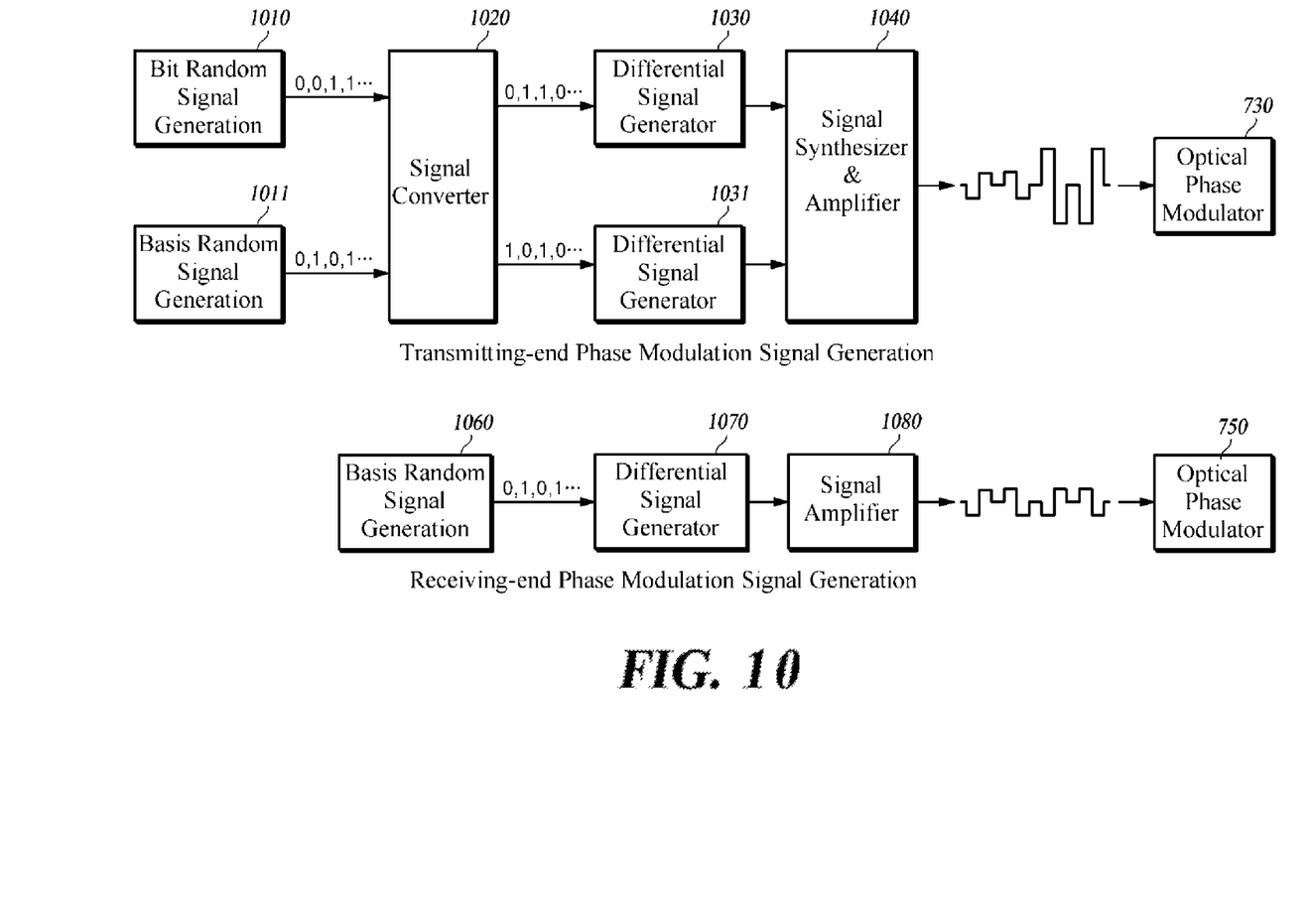
FIG. 10 is a schematic diagram of a phase modulation signal generator incorporating the signal conversion feature shown in FIG. 9 according to at least one embodiment of the present disclosure.

FIG. 10 is a simplified diagram representing the structure of the phase modulation signal generator including the signal-converting feature presented in FIG. 9.

As depicted in FIG. 10, the randomly generated bit and basis signals are converted into signals for differential phase modulation by using a signal converter 1020. The differential signals generated by a differential signal generator 1030 in response to the converted bit and basis signals pass through a signal synthesizer and amplifier 1040 are finally inputted into the optical phase modulator 730. The bit and basis signals generated by the RNG 1010, 1011 are stored in a memory device (not shown) for basis comparison and the final key general process; however, the signals generated by the signal converter 1020 need not be stored because they are used only for phase modulation.

While the differential phase modulation and phase modulation signal generation methods exemplified above are based on the BB84 protocol, the same methods can be applied to the SARG04 (Scarani-Acin-Ribordy-Gisin) protocol that has a similar physical structure.

In some embodiments of the present disclosure, as described in the technical disclosure above, the operating ranges of an optical phase modulator and its driver applied to a phase modulation-based quantum key distribution system is able to be reduced by half, thereby alleviate the performance specifications of related devices or circuits and reducing operational errors by property deformation. Moreover, electrical signals for differential phase modulation can be generated efficiently.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A transmitting apparatus in a quantum key distribution system, the apparatus comprising:
   an optical interferometer configured to
      receive a single-photon pulse inputted from a light source and
      provide the single-photon pulse with two optical paths having a predetermined path difference between a first optical path and a second optical path, the two optical paths including the first optical path and the second optical path and being used for the single-photon pulse to pass through the optical interferometer, wherein the single-photon pulse, after passing through the optical interferometer, has a probability distribution divided into two separate regions in a time domain; and
   an optical phase modulator configured to perform a temporal differential phase modulation of the single-photon pulse which has passed through the optical interferometer, by imparting a phase-shift oppositely to the single-photon pulse for the two separate regions.

2. The apparatus of claim 1, wherein the optical phase modulator is configured so that the single-photon pulse has a predetermined phase difference or $\phi_A$ between when the single-photon pulse passes through a shorter path of the two optical paths and when the single-photon pulse passes through a longer path of the two optical paths.

3. The apparatus of claim 2, wherein the optical phase modulator is configured so that the single-photon pulse is phase-shifted by $-\phi_A/2$ when passing through one of the two optical paths and is phase-shifted by $\phi_A/2$ when passing through the other of the two optical paths.

4. The apparatus of claim 3, wherein said $\phi_A$ is a value predetermined in response to bit and basis information of random numbers.

5. The apparatus of claim 4, wherein said $\phi_A$ is one of the following values: $\pi/4$, $-\pi/4$, $3\pi/4$ and $-3\pi/4$.

6. The apparatus of claim 1, further comprising:
   a phase modulation signal generator configured to generate at least one differential phase modulation signal, corresponding to a bit signal and a basis signal of random numbers, for driving the optical phase modulator.

7. The apparatus of claim 6, wherein the differential phase modulation signal comprises a signal configured to be switched during one cycle from high to low or another signal configured to be switched during one cycle from low to high during one cycle.

8. The apparatus of claim 6, further comprising:
   a signal converter configured to perform a signal conversion from combinations of the bit and basis signals of random numbers, which are {0, 0}, {0, 1}, {1, 0} and {1, 1} to {0, 1}, {1, 0}, {1, 1} and {0, 0} so as to generate the differential phase modulation signal.

9. A receiving apparatus in a quantum key distribution system, the apparatus comprising:
  an optical phase modulator configured to
    receive a single-photon pulse from a transmitting apparatus of the quantum key distribution system, wherein the single-photon pulse has been differentially phase-modulated by the transmitting apparatus and has a probability distribution divided into two separate regions in a time domain, and
    perform a temporal differential phase modulation of the single-photon pulse, by imparting a phase-shift oppositely to the single-photon pulse for the two separate regions; and
  an optical interferometer configured to provide two optical paths delivered from the optical path modulator, for the single-photon pulse to pass through, the two optical paths having a predetermined path difference between a first optical path and a second optical path, the two optical paths including the first optical path and the second optical path, wherein the predetermined path difference is the same path difference as in the transmitting apparatus.

10. The apparatus of claim 9, wherein the optical interferometer is configured to further temporally divide the time-division probability distribution of the differentially phase-modulated single-photon pulse, which is delivered from the optical phase modulator, at the same interval as the time-division probability distribution.

11. The apparatus of claim 10, wherein the differentially phase-modulated single-photon pulse, after passing through the optical interferometer, has a probability distribution divided into three separate regions in the time domain.

12. The apparatus of claim 9, wherein the optical phase modulator is configured to perform the temporal differential phase modulation so that the received single-photon pulse has a predetermined additional phase difference or $\phi_B$ between two cases when the single-photon pulse passes through shorter and through longer optical paths provided by the transmitting apparatus.

13. The apparatus of claim 12, wherein the optical phase modulator is configured to perform the temporal differential phase modulation so that the received single-photon pulse is phase-shifted by $-\phi_B/2$ when passing through one of two optical paths provided by the transmitting apparatus and is phase-shifted by $\phi_B/2$ when passing through the other of the two optical paths.

14. The apparatus of claim 13, wherein said $\phi_B$ is a value predetermined in response to a basis information of random numbers.

15. The apparatus of claim 14, wherein said $\phi_B$ is either $\pi/4$ or $-\pi/4$.

16. The apparatus of claim 9, further comprising:
  a phase modulation signal generator configured to generate a differential phase modulation signal, corresponding to a basis signal of random numbers, for driving the optical phase modulator.

17. The apparatus of claim 16, wherein the differential phase modulation signal comprises a signal configured to be switched during one cycle from high to low or another signal configured to be switched during one cycle from low to high.

18. A method for transmission of quantum information in a quantum key distribution system, the method comprising:
  receiving a single-photon pulse from a light source;
  providing the single-photon pulse with two optical paths having a predetermined path difference between a first optical path and a second optical path such that the single-photon pulse has a probability distribution divided into two separate regions in a time domain, wherein the two optical paths include the first optical path and the second optical path;
  performing a temporal differential optical phase modulation of the single-photon pulse, by imparting a phase-shift oppositely to the single-photon pulse for the two separate regions; and
  transmitting the differentially modulated single-photon pulse to a receiving apparatus via a quantum channel.

19. A method for reception of quantum information in a quantum key distribution system, the method comprising:
  receiving a single-photon pulse from a transmitting apparatus via a quantum channel, wherein the single-photon pulse has been differentially phase-modulated by the transmitting apparatus and has a probability distribution divided into two separate regions in a time domain;
  performing a temporal differential phase modulation of the single-photon pulse, by imparting a phase-shift oppositely to the single-photon pulse for the two separate regions; and
  providing the temporal differential phase-modulated single-photon pulse with two optical paths having a predetermined path difference between a first optical path and a second optical path, the two optical paths including the first optical path and the second optical path, wherein the predetermined path difference is the same path difference as in the transmitting apparatus so that the temporal differential phase-modulated single-photon pulse has an additional time-divided probability distribution.

* * * * *